US008573668B2

(12) United States Patent
Miklas (10) Patent No.: US 8,573,668 B2
(45) Date of Patent: Nov. 5, 2013

(54) RETRACTING STORAGE TRAY SYSTEM WITH LOCKING TRUNNION

(75) Inventor: John L. Miklas, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 184 days.

(21) Appl. No.: 13/301,098

(22) Filed: Nov. 21, 2011

(65) Prior Publication Data
US 2013/0126570 A1    May 23, 2013

(51) Int. Cl.
*B60N 3/10* (2006.01)
*B60R 7/04* (2006.01)

(52) U.S. Cl.
USPC ........................... 296/37.1; 248/311.2

(58) Field of Classification Search
USPC ........ 16/50, 348, 357, 361; 49/339, 340, 344, 49/345; 224/282, 483, 926; 248/296.1, 248/299.1, 309.1, 311.2; 254/124; 296/37.1, 37.12
See application file for complete search history.

(56) References Cited

U.S. PATENT DOCUMENTS

| 4,421,450 | A | * | 12/1983 | Kouno | 414/719 |
|---|---|---|---|---|---|
| 4,728,018 | A | * | 3/1988 | Parker | 224/544 |
| 4,844,399 | A | * | 7/1989 | Harm | 248/311.2 |
| 4,854,076 | A | * | 8/1989 | Sieben et al. | 49/280 |
| 5,106,003 | A | * | 4/1992 | Ma | 224/311 |
| 5,279,452 | A | * | 1/1994 | Huynh | 224/482 |
| 5,279,489 | A | * | 1/1994 | Wheelock et al. | 248/311.2 |
| 5,289,962 | A | | 3/1994 | Tull et al. | |
| 5,522,527 | A | * | 6/1996 | Tsai | 224/414 |
| 5,533,772 | A | * | 7/1996 | Volkers et al. | 296/37.9 |
| 5,618,018 | A | * | 4/1997 | Baniak | 248/311.2 |
| 5,639,052 | A | * | 6/1997 | Sauve | 248/311.2 |
| 5,690,036 | A | * | 11/1997 | Hasegawa | 108/25 |
| 5,692,718 | A | | 12/1997 | Bieck | |
| 5,697,593 | A | * | 12/1997 | Bieck | 248/311.2 |
| 5,820,094 | A | * | 10/1998 | Tanaka | 248/311.2 |
| 6,024,395 | A | | 2/2000 | Kang | |
| 6,095,471 | A | * | 8/2000 | Huang | 248/311.2 |
| 6,755,455 | B2 | * | 6/2004 | Choi | 296/37.12 |
| 7,240,398 | B2 | * | 7/2007 | Watanabe et al. | 16/51 |
| 7,568,749 | B2 | * | 8/2009 | Biggs et al. | 296/37.8 |

(Continued)

FOREIGN PATENT DOCUMENTS

DE    10060798 A1    6/2002
JP    63093641 A  *  4/1988    ............ B60N 3/10

(Continued)

*Primary Examiner* — Glenn Dayoan
*Assistant Examiner* — Paul Chenevert
(74) *Attorney, Agent, or Firm* — Vichit Chea; MacMillan, Sobanski & Todd, LLC (57) ABSTRACT

A tray system has a trunnion carriage mounted to a recess in a housing. A trunnion body is rotatably mounted to the carriage. A push member is slidable within the carriage. Moving the push member from a first end of travel to a second end of travel transfers a force against the trunnion body to move it to a deployed position. When the push member is at the second end then it locks the trunnion body against movement out from the deployed position. Moving the push member back to the first end transfers a force against the trunnion body to move it to the retracted position. A tray coupled to and movable with the trunnion body retracts vertically in the recess when the trunnion body is in the retracted position and deploys horizontally outward from the recess when the trunnion body is in the deployed position.

11 Claims, 6 Drawing Sheets

(56) References Cited

U.S. PATENT DOCUMENTS

| | | |
|---|---|---|
| 7,740,217 B2 | 6/2010 | Prowe |
| 7,794,000 B2 * | 9/2010 | Ichimaru ............... 296/24.34 |
| 8,052,108 B2 * | 11/2011 | Ahn et al. ............... 248/309.1 |
| 2002/0148868 A1 * | 10/2002 | Dion-Bildstein et al. .... 224/401 |
| 2005/0224676 A1 | 10/2005 | Stavermann |
| 2006/0012204 A1 * | 1/2006 | Chang ............... 296/37.1 |
| 2012/0280100 A1 * | 11/2012 | Stephan ............... 248/311.2 |
| 2013/0126691 A1 * | 5/2013 | Miklas ............... 248/311.2 |

FOREIGN PATENT DOCUMENTS

| | | | | |
|---|---|---|---|---|
| JP | 05278509 A | * | 10/1993 | ............ B60N 3/00 |
| JP | 06092174 A | * | 4/1994 | ............ B60N 3/10 |
| JP | 2009280005 A | | 12/2009 | |

* cited by examiner

RETRACTING STORAGE TRAY SYSTEM WITH LOCKING TRUNNION

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to storage units such as cup holders in vehicles, and, more specifically, to a mechanism for deploying a stowable tray from a vertical panel.

Readily accessible and plentiful cup holders are desired by users of vehicles and other seating environments such as theaters and stadiums In some locations such as the rear seats of a vehicle passenger compartment, the locations for placing a conventional cup holder have been very limited due to the absence of horizontal surfaces and the lack of depth behind the available vertical surfaces (such as the trim surface of a side door or the back surface of the front passenger seats or console). Due to the limited area and the potential interference of a cup holder with a passenger's movements into or out of their seat (especially for a rear seat passenger), it is also desirable to make the cup holder stowable into the door panel or other vertical surface.

Many prior attempts to package cup holders in these locations have produced flimsy cup holders which lack structural integrity, are difficult to use, and require excessive space within the wall panel from which it deploys. It would be desirable to provide a cup holder that efficiently uses the limited packaging space available and has good structural support and robustness.

SUMMARY OF THE INVENTION

In one aspect of the invention, a retractable tray system deployable from a vertical panel, includes a housing with a recess configured to lie behind the vertical panel. A trunnion carriage is mounted to the recess with a pair of pivot holes along a pivot axis. A trunnion body is rotatably mounted to the carriage for rotating about the pivot axis between a retracted position and a deployed position. A push member is slidable within the trunnion carriage between a first end of travel and a second end of travel. Moving the push member from the first end of travel to the second end of travel transfers a force against the trunnion body to move it from the retracted position to the deployed position. When the push member is at the second end of travel then the push member locks the trunnion body against movement from the deployed position toward the retracted position. Moving the push member from the second end of travel to the first end of travel transfers a force against the trunnion body to move it from the deployed position to the retracted position. A tray is coupled to and movable with the trunnion body, wherein the tray retracts vertically in the recess when the trunnion body is in the retracted position, and wherein the tray deploys horizontally outward from the recess when the trunnion body is in the deployed position.

DETAILED DESCRIPTION OF PREFERRED EMBODIMENTS

Figure 1:
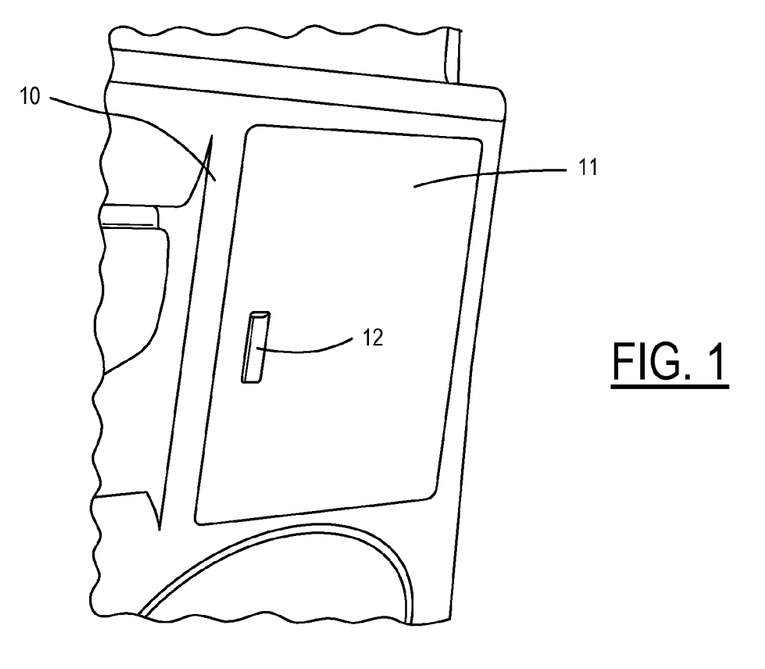
FIG. 1 is a perspective view of a cup holder of the present invention with an outer door closed.
Figure 2:
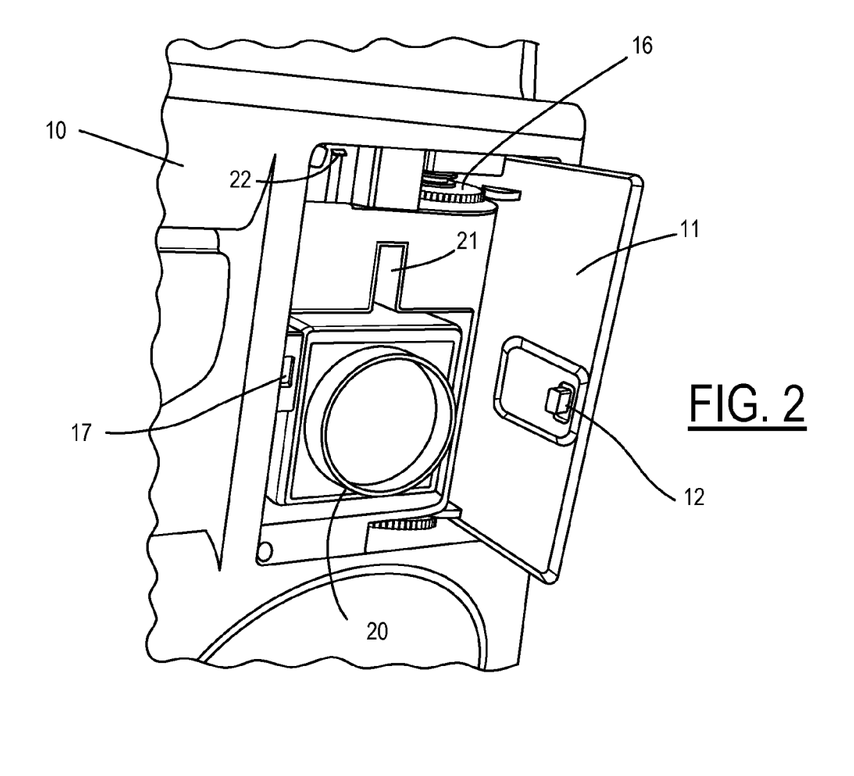
FIG. 2 is a perspective view of the cup holder of FIG. 1 with the outer door open and the tray retracted.
Figure 3:
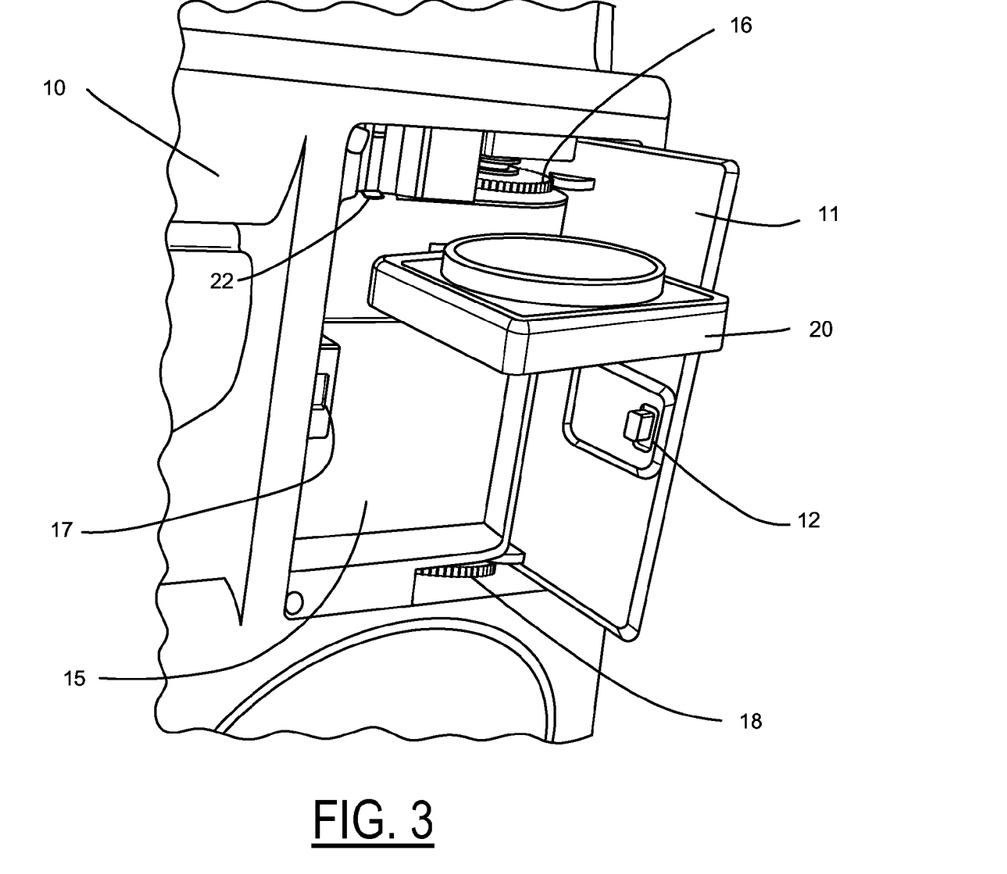
FIG. 3 is a perspective view of the cup holder of FIG. 1 with the outer door open and the tray deployed.

Referring now to FIG. 1, a deployable tray system is mounted to a vertical panel 10 such as a vehicular door trim panel, a seat back (such as for a vehicle seat or a theatre seat), or a wall of a room. A swinging door 11 opens in response to pressing a latch tab 12 to reveal a deployable tray system as shown in FIG. 2. A recessed housing 15 supports a hinges 16 and 18 for door 11. Housing 15 may be an integral part of vertical panel 10 or may be mounted as a separate component. Latch tab 12 interfaces with a catch 17 on the edge of housing 15. A tray 20 has a retracted position shown in FIG. 2 wherein the retracted tray lies vertically within recessed housing 15. Housing 15 includes a slot 21 through which tray 20 is coupled with a trunnion mechanism (described more fully below) for pivoting tray 20 upward to a deployed position shown in FIG. 3. A push tab 22 is linked to the trunnion mechanism so that pressing down on push tab 22 from the position shown in FIG. 2 to the position shown in FIG. 3 raises tray 20 from the retracted position to the deployed position.

Figure 4:
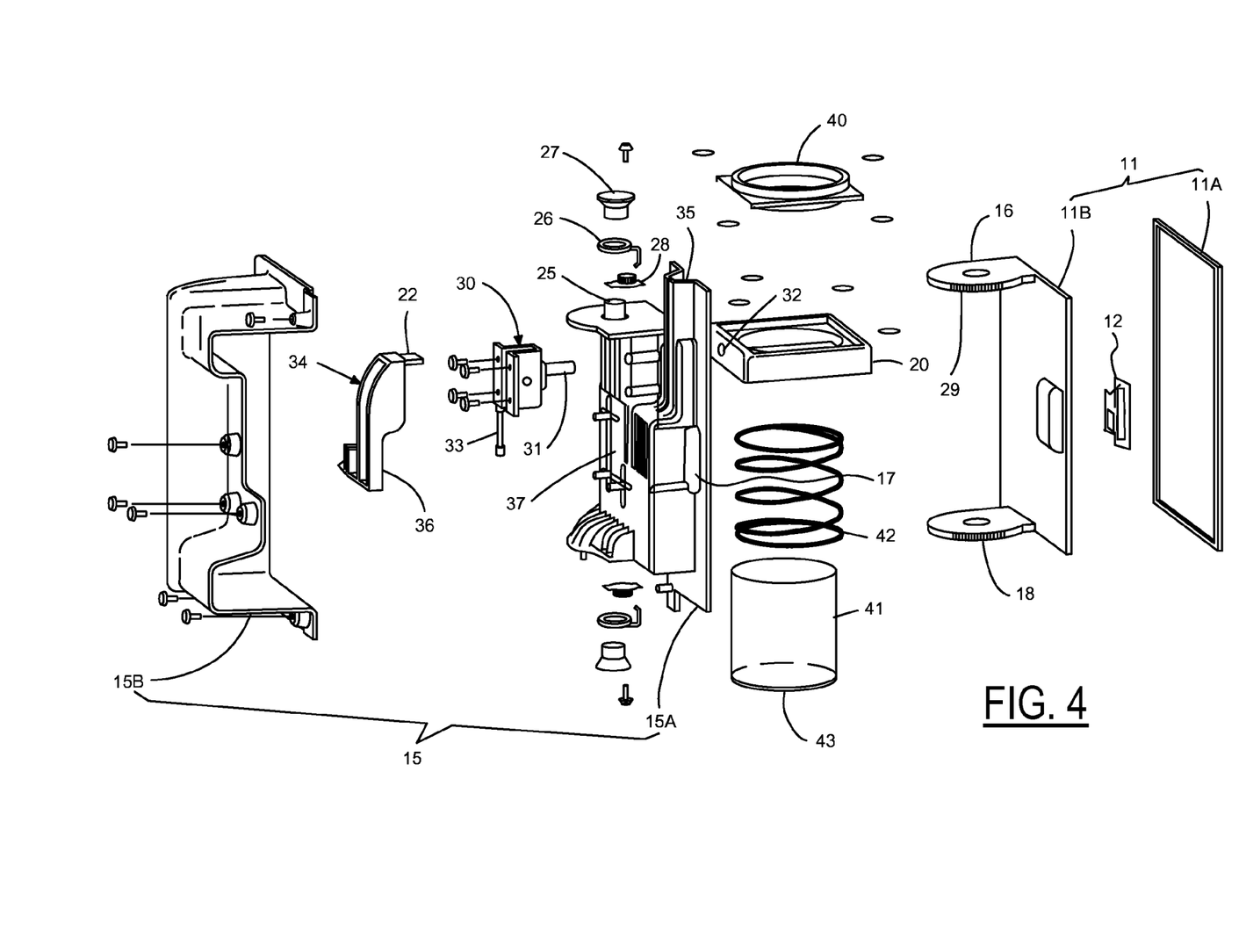
FIG. 4 is an exploded view of the cup holder of FIG. 1.

The retractable tray system is shown in greater detail in the exploded view of FIG. 4. Door 11 includes a base member 11B and a trim cover 11A. Hinge 16 connects to a hub 25 on a first housing portion 15A. A second housing portion 15B attaches to housing portion 15A and acts as a protective cover over the moving parts. A washer 26 and cap 27 serve to connect hinge 16 to hub 25. Hinge 16 has a toothed outer segment 29 that meshes with a damping element 28 to provide resistance to door movement when it is in the open position.

A trunnion mechanism 30 attaches to the rear side of housing 15A and has a coupling shaft 31 which passes through slot 21 (see FIG. 2) in housing 15A and has its end secured in a mounting hole 32 in tray 20. A push rod 33 extends from trunnion mechanism 30 whereby vertical movement of push rod 33 causes the pivotable motion of shaft 31 as will be explained below. A slidable control member 34 has push tab 22 projecting from its top end through a slot 35 on housing 15A. Lower end 36 of control member 34 slides within guide slots 37 on housing 15A to determine upper and lower limits to the vertical movement of control member 34. Push rod 33 is coupled to control member 34 so that by manually moving push tab 22 up and down, a user pivots trunnion mechanism 30 so that tray 20 moves between the retracted, vertical position within the recess and the deployed, horizontal position shown in FIG. 3.

Tray 20 may have a flat upper surface for supporting articles (not shown). More preferably, tray 20 is adapted to retain specific articles such as beverage containers or similarly shaped articles by deploying a collapsible storage bag. A collapsible cup holder as described in a copending application found in Pre-Grant Publication 2013/0126691 A1 published May 23, 2013, which may preferably be carried by tray 20 as shown in FIG. 4. This copending application is hereby incorporated by reference. Thus, a removable bag system includes an upper rim 40 having a flexible bag 41 suspended therefrom. Bag 41 is joined with an internal coil spring 42 extendible within bag 41 to a position for receiving articles for storage. A bottom plate 43 is attached to bag 41 to support the bottom of a beverage container, for example. Spring 42 has its coils brought together in its natural state in order to collapse bag 41 for easy retraction. Magnet retainers attached to tray 20 and rim 40 keep the bag assembly attached to tray 20, while making the bag assembly removable for cleaning.

Figure 5:
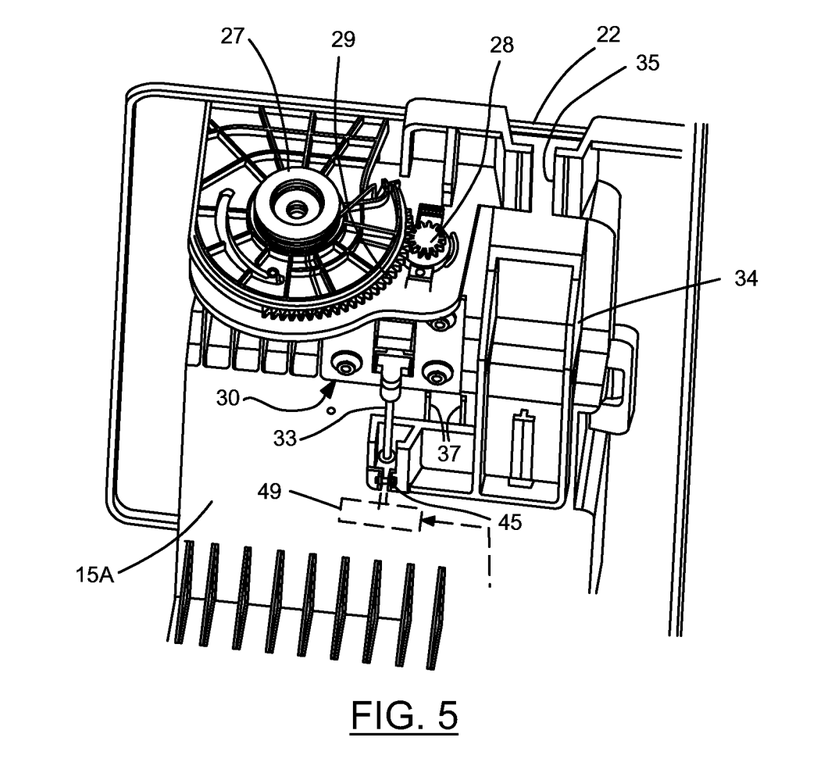
FIG. 5 is a rear perspective view of the cup holder of FIG. 1.

As seen in the rear view of FIG. 5, a fastener 45 is provided on control member 34 in order to attach it to push rod 33. Thus, push rod 33 together with control member 34 provides a linkage coupled between push tab 22 and trunnion mechanism 30. Instead of manual activation using a slidable control member, the invention may be adapted to provide powered movement of the tray. Thus, a linear drive motor 49 may be coupled to push rod 33. Drive motor 49 could be mounted to the rear side of housing 15A and receive an electric control signal from a remotely controlled switch (not shown).

Trunnion mechanism 30 is shown in greater detail in FIGS. 6-9. A trunnion carriage 50 has a base plate 51 with mounting holes 52 for attaching to the housing. A central opening 53 in carriage 50 receives a trunnion body 55. Carriage 50 includes pivot holes 56 along a pivot axis. Trunnion body 55 includes trunnion elements 57 received in pivot holes 56 for rotating body 55 about the pivot axis between the retracted position and the deployed position.

Carriage 50 has a guide hole 60 for receiving push rod 33. A coupler 61 is attached to one end of push rod 33, and a push member 62 is connected to the other end of push rod 33. A lever arm 63 extends from the side of trunnion body 55 to interact with push member 62. In response to motion of push rod 33, push member 62 has reciprocal motion between a first end of travel, as shown in FIG. 7 (corresponding to the retracted tray position), and a second end of travel, as shown in FIG. 6 (corresponding to the deployed tray position).

In moving from the second end of travel to the first end of travel, push member 62 transfers a force against lever arm 63 thereby rotating trunnion body 55 to the retracted position. When push member 62 moves from the first end of travel to the second end of travel, it transfers a force against a surface 64 of trunnion body 55 which raises tray 20 to the deployed position. While at the second end of travel, push member 62 locks trunnion body 55 against movement from the deployed position toward the retracted position since it remains in the way. Thus, tray 20 is firmly held in place so that large loads can be supported by tray 20.

Push member 62 may preferably comprise a sliding pin 65 mounted in a guide slot 66 within carriage 50. Guide slot 66 likewise extends between the first and second ends of travel. Sliding pin 65 is an integral part of push member 62 so that so that it moves between the ends of guide slot 66 in response to movement of push rod 33. Sliding pin 65 bears against trunnion body 55 when body 55 is in the deployed position to prevent any counter-rotation of body 55, thereby locking body 55 and tray 20 in the deployed position. A bore 67 on trunnion body 55 receives shaft 31 that couples to tray 20. It should be noted that pin 65, member 62 and push rod 33 could all be integrally formed, e.g., from molded plastic.

Figures 6, 7, 8:
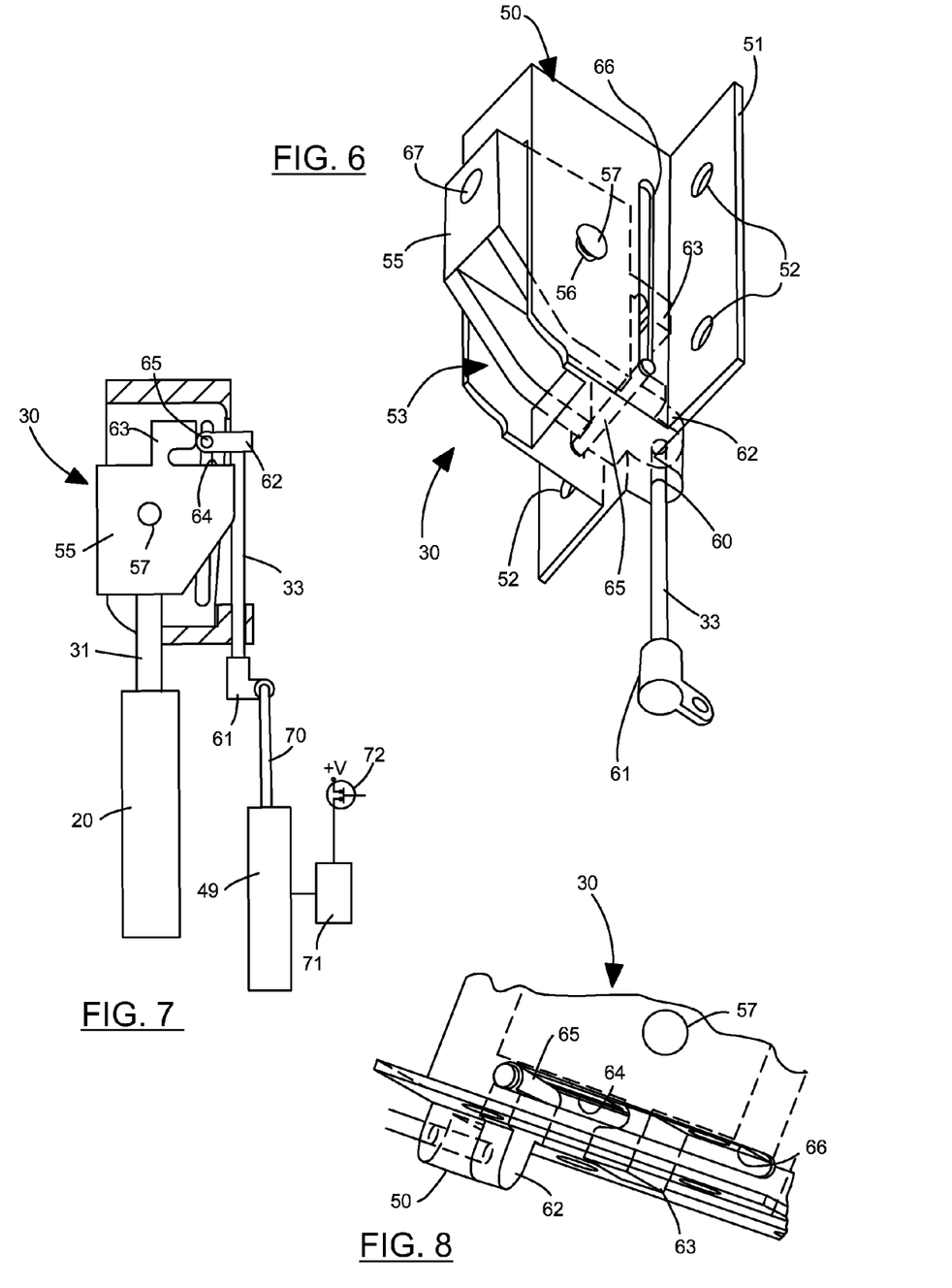
FIG. 6 is a perspective view of one embodiment of the trunnion mechanism of the present invention in the deployed position.
FIG. 7 is a side view of the trunnion mechanism in the retracted position.
FIG. 8 is perspective view showing a push block and push roller of the trunnion mechanism in greater detail.
Figure 9:
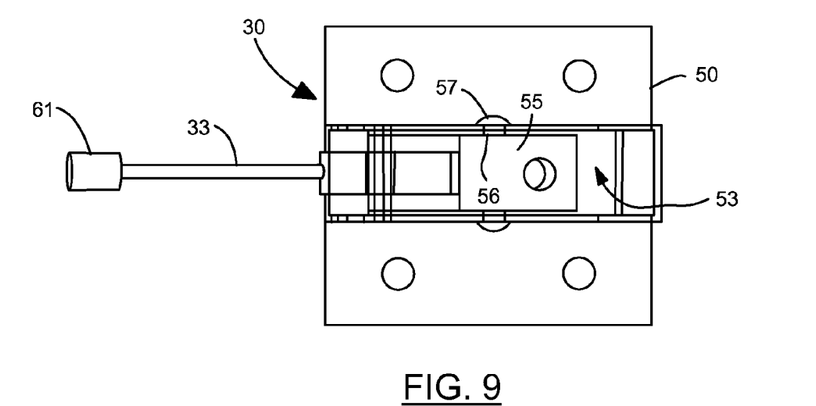
FIG. 9 is a bottom view of the trunnion mechanism.

As shown in FIG. 7, coupler 61 may be connected to a reciprocating shaft 70 driven by linear drive motor 49. An electric drive signal may be provided to drive motor 49 by a controller 71 in response to a manually-triggered signal from a push button switch element 72.

Figure 10:
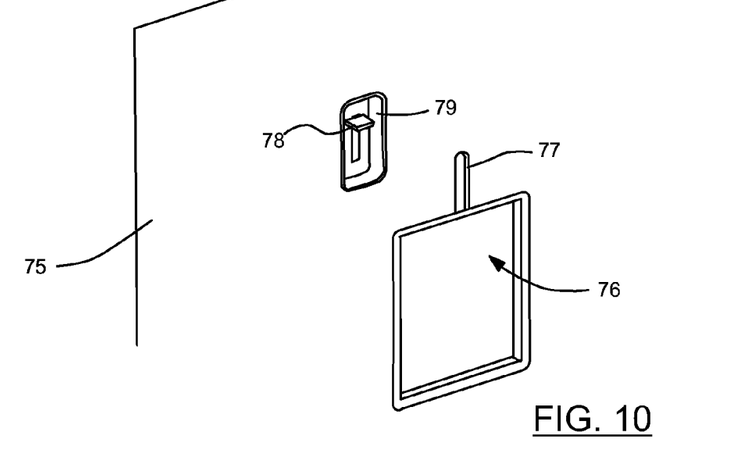
FIG. 10 is a perspective view of an alternate embodiment of a cup holder in a closed state and without an outer door.
Figure 11:
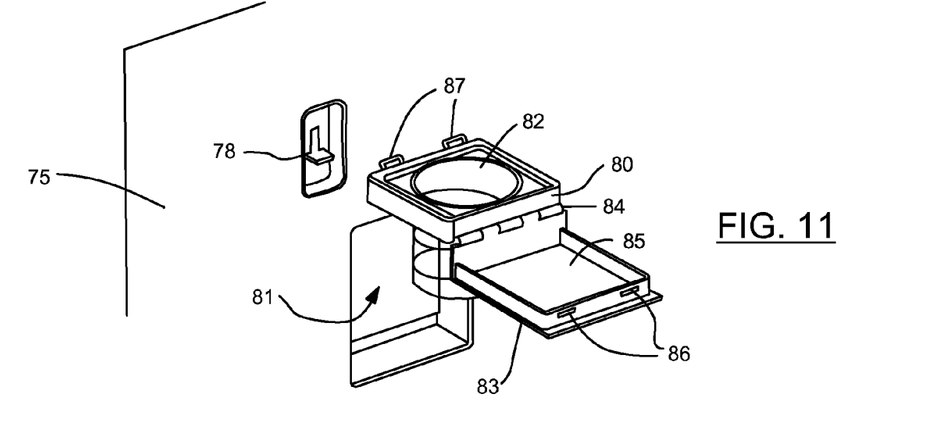
FIG. 11 is a perspective view of the cup holder of FIG. 10 in an open state.

FIGS. 10 and 11 illustrate an alternative embodiment of the present invention employing the trunnion mechanism with a tray assembly not requiring an outer cover door. Thus, a vertical panel 75 such as an interior door trim panel includes a tray assembly 76 which deploys from a recess 81. A trunnion mechanism (not shown) is mounted to the rear side of panel 75 adjacent a slot 77 in trim panel 75. A linkage for controlling the trunnion mechanism includes a push tab 78 accessible within a recess 79. Push tab 78 has an upper position shown in FIG. 10 corresponding with a retracted tray position. Flexible flaps or a sliding trim piece may be mounted in or behind slot 77 to block the sight lines through slot 77 when in the retracted tray position.

By moving push tab 78 down to a lower position as shown in FIG. 11, a tray 80 pivots to a deployed position out of recess 81. A storage bag 82 is provided in tray 80. A trim cover 83 is mounted to tray 80 by hinges 84 so that it can be flipped over into an open position to provide a storage shelf 85. A pair of latches 87 are releasable from a pair of slots 86 to open trim cover 83. In the open position, trim cover 83 provides shelf 85 adjacent collapsible bag 82 for storing both a cup holder and other items simultaneously. With cover 83 in its closed position (not shown), tray 80 can be used as a shelf without accessing bag 82. Cover 83 preferably is formed of the same material and has the same color as panel 75 to provide a matching appearance when retracted.

What is claimed is:

1. A retractable tray system deployable from a vertical panel, comprising:
  a housing with a recess configured to lie behind the vertical panel;
  a trunnion carriage mounted to the recess with a pair of pivot holes along a pivot axis;
  a trunnion body rotatably mounted to the carriage for rotating about the pivot axis between a retracted position and a deployed position; and
  a push member slidable within the trunnion carriage between a first end of travel and a second end of travel, wherein moving the push member from the first end of travel to the second end of travel transfers a force against the trunnion body to move the body from the retracted position to the deployed position, wherein when the push member is at the second end of travel then the push member locks the trunnion body against movement from the deployed position toward the retracted position, and wherein moving the push member from the second end of travel to the first end of travel transfers a force against the trunnion body to move the body from the deployed position to the retracted position.

2. The system of claim 1 further comprising:
  a tray coupled to and movable with the trunnion body, wherein the tray retracts vertically in the recess when the trunnion body is in the retracted position, and wherein the tray deploys horizontally outward from the recess when the trunnion body is in the deployed position.

3. The system of claim 2 further comprising:
  a collapsible bag suspended from the tray to receive items for storage.

4. The system of claim 3 wherein the collapsible bag is configured to hold beverage containers.

5. The system of claim 3 further comprising:

a trim cover pivotably mounted to the tray having a closed position for concealing the tray with the trunnion body in the retracted position and having an open position for 1) exposing the tray and 2) providing a horizontal shelf adjacent the collapsible bag while the trunnion body is in the deployed position.

6. The system of claim 2 wherein the housing has a front side and an opposing back side, wherein the trunnion carriage is mounted to the back side, and wherein the housing has a slit through which the trunnion body is attached to the tray.

7. The system of claim 6 further comprising:

a slidable control member with a push tab that is manually accessible from the front side of the housing; and a linkage coupled between the slidable control member and the push member;

wherein a user deploys and retracts the tray by moving the push tab.

8. The system of claim 6 further comprising:

a drive motor coupled to the push member and responsive to an electric drive signal for driving the push member between the first and second ends of travel; and a switch element for generating the electric drive signal under manual control of a user.

9. The system of claim 1 wherein the trunnion carriage includes a guide slot extending between the first end of travel and the second end of travel, and wherein the push member comprises a sliding pin traversing the guide slot in response to movement of the push member, so that the sliding pin bears against the trunnion body when the trunnion body is in the deployed position.

10. The system of claim 1 further comprising a cover door having a closed position covering the recess and substantially flush with the vertical panel and having an open position away from the deployed tray.

11. The system of claim 1 wherein the vertical panel is a surface within an automotive vehicle, and wherein the housing is configured to attach to the vertical panel.

* * * * *